July 30, 1929.  L. H. FOWLER  1,722,696
TEAPOT
Filed July 12, 1927   2 Sheets-Sheet 1

INVENTOR
Leonard H. Fowler.

July 30, 1929.     L. H. FOWLER     1,722,696
TEAPOT
Filed July 12, 1927     2 Sheets-Sheet 2

INVENTOR
Leonard H. Fowler

Patented July 30, 1929.

1,722,696

UNITED STATES PATENT OFFICE.

LEONARD HENRY FOWLER, OF MAIDSTONE, ENGLAND, ASSIGNOR OF ONE-HALF TO WILLIAM EDWARD BALLARD, OF MAIDSTONE, ENGLAND.

TEAPOT.

Application filed July 12, 1927. Serial No. 205,123.

This invention relates to teapots and has for its primary object to provide a convenient form of heat retaining teapot in which tea can be made and consequently allowed to stand and remain hot for considerable periods. With this object in view, as will appear as the description proceeds, the invention consists in the novel construction and arrangements of parts as hereinafter more specifically set forth, claimed and shown in the accompanying drawings forming a part of the present application and in which:

Figure 1:
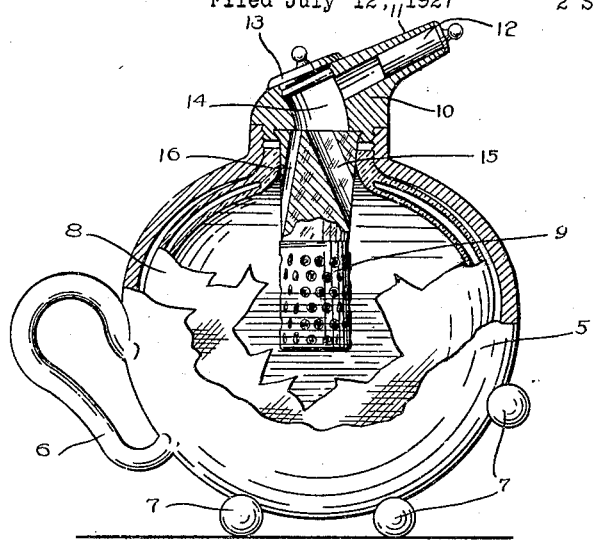
Fig. 1 is a part sectional view of the teapot in position for filling with boiling water.
Figure 2:
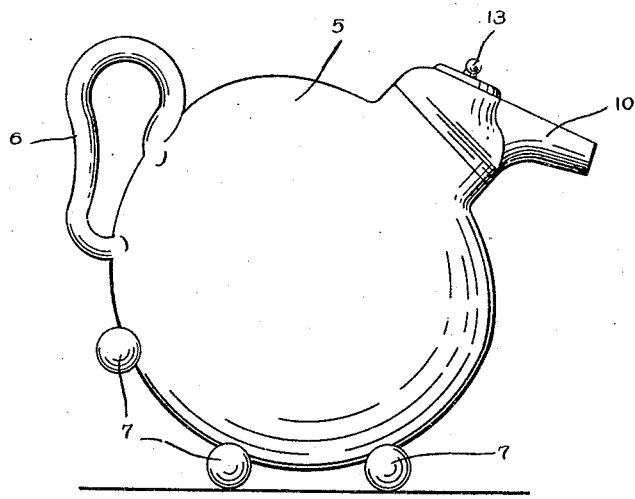
Fig. 2 is a view of the teapot in position for pouring the tea.
Figure 3:
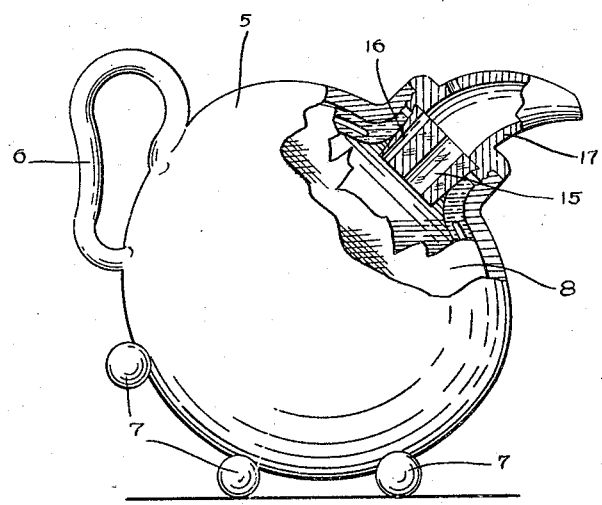
Fig. 3 is a part sectional view showing the interchangeable spout.
Figure 4:
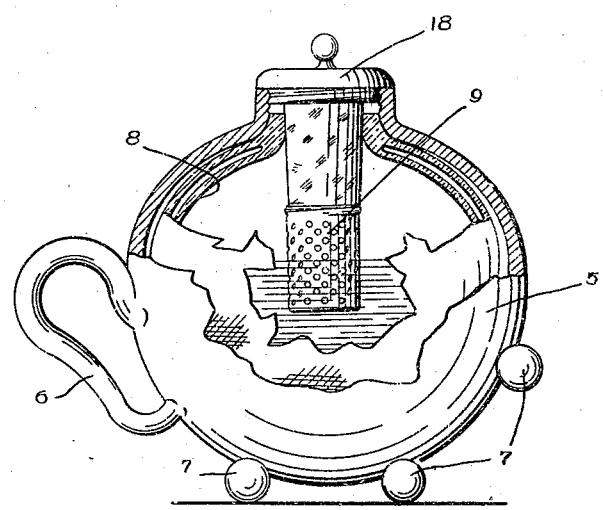
Fig. 4 is a part sectional view showing infuser and interchangeable stopper.

Referring more in detail to the drawings in which similar reference characters designate corresponding parts throughout the several views, it will be seen that the teapot is comprised of an outer case 5, having the usual handle 6 and a double set of feet 7, which permit the teapot to stand in two positions as shown in the drawings. In the interior of this case is a vacuum vessel 8 of suitable shape and is provided with an infuser 9 in which the tea is placed when making tea and which may be removed after infusion has taken place, 10 is the top having an outlet or spout 11 fitted with a cork 12, to be used while the tea is being made, 13 is a stopper for the hole 14 through which the hot water is poured. The infuser 9 may be made in the shape of a cork or plug having a main hole 15 for the water and an air vent 16 to allow the air to escape as the vessel is being filled. 17 is an interchangeable top of a simpler design which may be used in place of the spout top 10. When this top 17 is used it is necessary that it be removed to pour the water into the vessel, after which a stopper 18 is placed in the hole to seal the top while infusion takes place. When this is done the stopper 18 is removed and the top 17 replaced.

It is believed that the construction and advantages of the structure shown may be apparent from the foregoing paragraphs taken in connection with the accompanying drawings without further detailed description.

While the preferred embodiment of the invention has been disclosed it is understood that minor changes in the details of construction, combination and arrangement of co-operating parts may be resorted to within the scope of what is claimed without departing from the spirit of the invention.

What I claim:

1. In a teapot having a vacuum vessel of suitable shape to fit within an outer case and being provided with a means of sealing the vacuum vessel when the tea is made, and having an infuser designed to fit the neck of the vacuum vessel with a passage-way for the water and an air vent to allow the air to escape from the vessel as the same is being filled, and having an interchangeable spout and stopper which may be fastened to the neck of the vessel by screw thread or other suitable means, and having a double set of feet to allow the teapot to stand in two positions, substantially as set forth.

2. A teapot comprising a body of suitable shape having a neck, an infuser, a cork in the upper end of said infuser designed to tightly fit the neck of said body, said cork having a passage-way for water and an air vent, and a spout and stopper removably fitted in said neck.

In testimony whereof I affix my signature.

LEONARD HENRY FOWLER.